Aug. 1, 1950     E. M. BARBER     2,516,943
APPARATUS FOR CATALYTIC TREATMENT OF HYDROCARBONS
Filed June 14, 1947
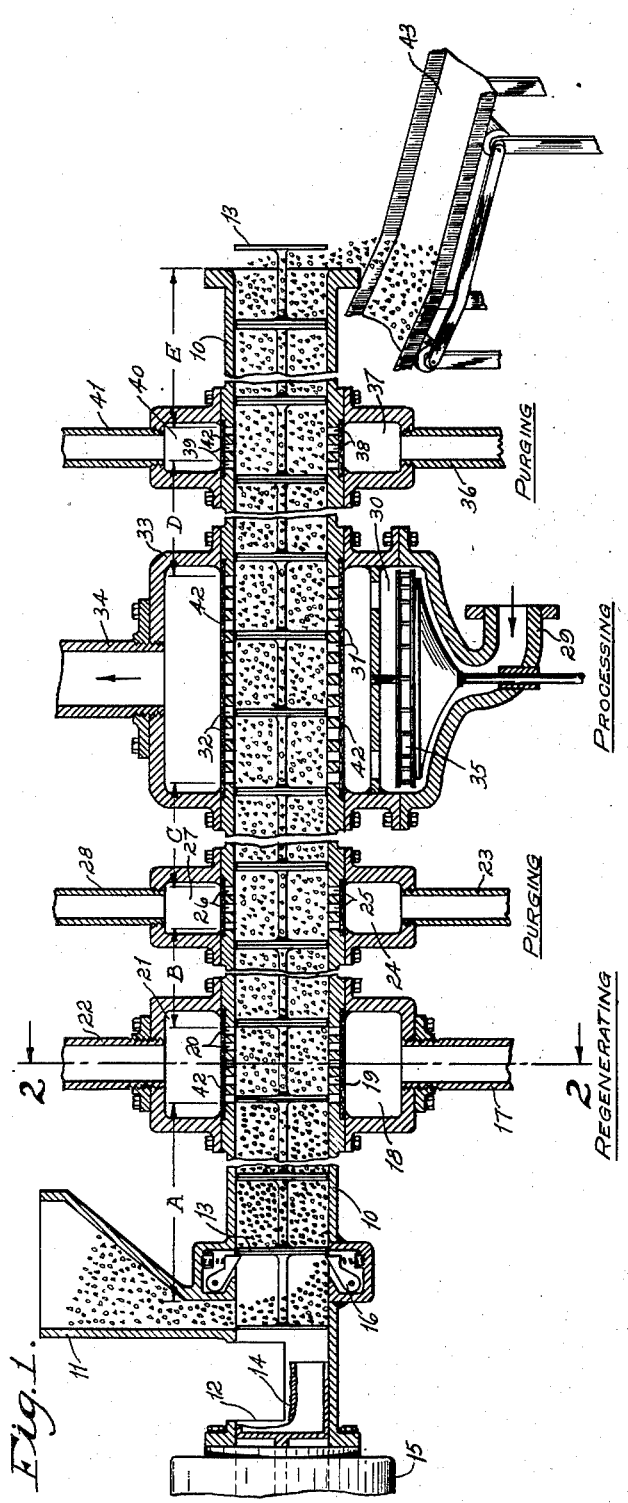
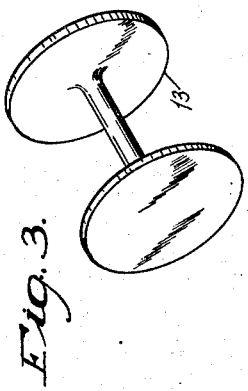
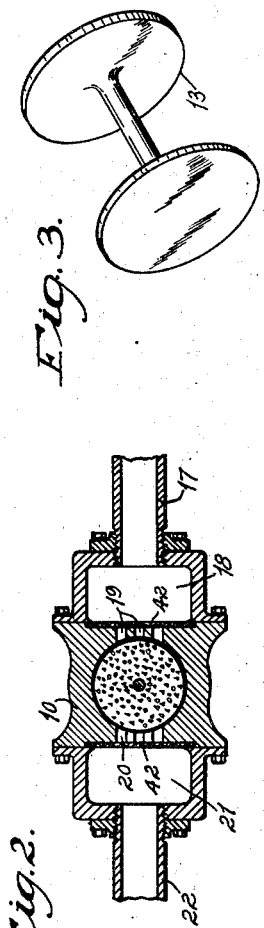
INVENTOR.
EVERETT M. BARBER
BY
ATTORNEY Patented Aug. 1, 1950

2,516,943

UNITED STATES PATENT OFFICE 2,516,943

APPARATUS FOR CATALYTIC TREATMENT OF HYDROCARBONS

Everett M. Barber, Wappingers Falls, N. Y., assignor to The Texas Company, New York, N. Y., a corporation of Delaware Application June 14, 1947, Serial No. 754,754

2 Claims. (Cl. 23—288)

This invention relates to certain improvements in the catalytic treatment of hydrocarbons, such as catalytic cracking and reforming, dehydogenation, desulfurization and in general to the treatment of hydrocarbons with solid catalysts.

In accordance with the invention the catalyst is charged to an elongated reactor in a succession of segregated increments or beds which are moved forwardly through the reactor while the hydrocarbons for treatment are passed through the catalyst beds transversely of the path of movement of the catalyst. The invention is particularly adapted for processes in which the catalyst is regenerated in which case the catalyst beds are moved through the elongated chamber through transverse streams of hydrocarbons for processing and regenerating gas for reactivating the catalyst.

The invention contemplates an elongated chamber containing a plurality of catalyst beds disposed for translation therein and ports in the chamber to provide for the passage of fluids through the catalyst transversely to the path of movement of the beds. In accordance with the invention the chamber is provided with means for introducing spacer elements and catalyst at one end thereof to thereby charge segregated bodies of catalyst to the chamber, means for positively moving the segregated increments of catalyst through the chamber and means for introducing hydrocarbons and regenerating gas to spaced zones in the chamber for transverse flow through the several catalyst beds.

The invention is particularly directed to the catalytic cracking of hydrocarbon oil and is especially adapted for obtaining good conversions with high oil to catalyst ratios or high specific through-puts and with reduced equipment sizes and catalyst inventories.

The invention will be understood from the following detailed description thereof having reference to the accompanying drawings wherein:

Fig. 1 is a longitudinal section of an elongated reactor constituting a preferred embodiment of the invention.

Fig. 2 is a cross-section taken on the line 2—2 of Fig. 1.

Fig. 3 is an enlarged perspective view of a dual spacer disk adapted to travel within the reactor.

As shown in the drawing an elongated cylindrical chamber or pipe 10 is arranged for the passage of the catalyst through the pipe through successive regenerating, processing and purging sections thereof. At the charging end of the pipe a hopper 11 is disposed for introducing catalyst into the pipe reactor 10. Immediately ahead of the hopper there is an opening 12 in the pipe for the insertion of metal spacer disks 13. As shown in Fig. 3, the spacer disks are preferably in the form of a spool comprising a pair of disks interconnected by an axial rod. Each disk is of a diameter adapted to provide a neat running fit within the pipe reactor. These spacer elements may be in the form of a single disk but the dual form is preferable since it facilitates the proper translation of the disks within the pipe.

A piston 14 operated by a thrustor actuator 15 is disposed at the charging end of the pipe reactor. The piston is shown in the drawing in a partially retracted position. With the piston in the completely retracted position a spool 13 is inserted through the opening 12. Upon the forward movement of the piston, the spool is pushed forward beneath the hopper, the forward disk of the spool being moved just past spring-pressed triggers 16. The space between the dual disks is filled with catalyst from the hopper, the catalyst received from the hopper being collected as a compact mass or bed within the dual disks. When the piston is again retracted, another spool is inserted through the opening 12 and the latter spool is pushed forward to replace the one under the hopper. In this way, the several spools containing the several increments of catalyst are pushed forward through the pipe reactor through successive regenerating, purging and processing sections thereof.

In the regenerating section air or oxygen-containing gas is introduced through a pipe 17 into a chamber 18 which surmounts the pipe reactor. The oxygen-containing gas flows from this chamber through a plurality of ports 19 thence through the mass of catalyst. The products of combustion are discharged through outlet ports 20 into a receiving chamber 21 from which the gaseous products are removed through a line 22.

In the succeeding purging section a gas such as flue gas or steam is directed through a line 23 into a chamber 24 from which the purging gas is passed through a plurality of ports 25 into the catalyst mass so as to remove therefrom any products of combustion remaining after the regenerating step. The effluent gases flow through a plurality of ports 26 into a receiving chamber 27 and are removed through a pipe 28.

In the processing section hydrocarbons to be subjected to the catalytic treatment are introduced through a pipe 29 into a distributing chamber 30 and pass thence through a plurality of ports 31 through the catalyst mass. The products of reaction flow through a plurality of ports 32 into a receiving chamber 33 and are removed through a line 34 to suitable fractionating equipment for recovering the products.

In a preferred embodiment of the invention a centrifugal blower 35 is mounted in the chamber 30. In operating with the blower the hydrocarbon oil is preheated to a temperature just below the thermal cracking temperature and introduced at such temperature through the pipe 29. The rise in temperature from the compression produced by the blower functions to immediately raise the temperature of the oil to the temperature desired for the catalytic cracking. The time element under the compression prior to contacting with the catalyst is so small that any thermal cracking effect is practically eliminated.

In the succeeding purging section a suitable medium such as steam or inert gas, adapted for removing any hydrocarbons which may be contained in the catalyst after processing, is directed through a line 36 into a chamber 37. The purging medium flows through a plurality of ports 38 thence into the catalyst mass. The effluent gases pass through a plurality of ports 39 into a receiving chamber 40 and are removed through a line 41.

In each of the several processing, regenerating and purging zones, the assemblies of inlet and outlet ports are disposed opposite each other so as to establish a current of fluid flowing through the catalyst mass transversely of the path of movement of the catalyst beds. Preferably, these ports are arranged at the top and bottom of the elongated cylindrical chamber 10 so as to provide vertical paths of flow, downwardly or upwardly, through the catalyst beds. The hydrocarbons to be processed and the reactivating and purging gases are passed in continuous streams and catalyst beds are moved successively across the paths of the several streams. Although in the specific description herein the hydrocarbons and the regenerating gas are indicated as flowing in the same direction an advantageous operation is to have the flow of fluids in the processing and regenerating zones in opposite directions.

As shown in the drawing, screens 42 may be provided about the several assemblies of ports 19, 20, 25, 26, 31, 32, 38 and 39. While the screens are not always necessary, it is desirable to use them particularly when operating with the finer grades of catalyst in order to prevent loss of catalyst through the ports in the pipe reactor.

In practicing the invention for the cracking of oil any of the usual solid catalysts which are used in the cracking of hydrocarbons may be employed such as natural or synthetic composites of silica and alumina. Various composites of precipitated silica and alumina are well known as superior cracking catalysts. The catalyst is used in granular or pulverulent form, in pellets, in beads and the like.

The catalyst received from the charging hopper is collected in segregated compact masses within the several spools and the several increments of catalyst are forced through the pipe reactor through the successive regenerating, processing and purging sections thereof. The hydrocarbons in the processing zone, the reactivating gases in the regenerating zone and the purging gases in the purging zones flow through the several increments of moving catalyst transversely to the path of movement of the catalyst. The space velocity in processing, that is the volume of oil per hour per volume of catalyst, is regulated by the rate at which the hydrocarbons are charged to the processing section and the rate at which the catalyst is moved through the processing section. The time element in the processing, regenerating and purging zones is controlled by the axial length of the several zones and the rate at which the catalyst is passed therethrough. The movement of the piston is timed in accordance with the operating cycle desired. In the drawing the axial length of the processing section is indicated to be somewhat longer than that of the regenerating section; the relative length of these two sections will, however, vary with the character of the charging stock used and the amount of deposition of coke or carbon on the catalyst. Frequently it will be found that the axial length of the regenerating section should be greater than that of the processing section.

Each of the axial lengths, B, C and D should be of materially greater length than the diameter of the pipe reactor in order to assure that the fluids flowing through the several regenerating, purging and processing sections will not flow from one of these sections to an adjacent section. Similarly the axial lengths A and E should be materially greater than the diameter of the pipe reactor so as to assure that gaseous or vaporous constituents will not pass out through the charging or discharging ends of the pipe reactor. It is advisable to maintain the pressures in the several processing, regenerating and purging zones approximately the same so as to minimize the possibility of the flow of gases from one zone to another.

The used catalyst and the spaced disks are discharged from the pipe reactor to a conveyor 43. By means of the conveyor the used catalyst and the spacer disks may be returned to the charging end of the pipe reactor. Fresh or make-up catalyst is added to the hopper 11 as needed and the mixture of fresh and used catalyst is charged to the system.

In the particular arrangement illustrated in the drawing a sequence of regeneration followed by processing is shown. This is an advantageous sequence when the used catalyst is subjected to regeneration since it enables the bringing of highly heated catalyst to the processing stage. The invention contemplates, however, that the sequence may be reversed, the catalyst first passing through a processing stage and then to a regenerating stage. In cases where it is not desired to reactivate the catalyst the regenerating stage may be omitted, the catalyst being charged directly to the processing stage and after going through a purging stage, delivered to the conveyor for removal of the catalyst from the system. In cases where no regenerating stage is employed or where the sequence is processing followed by regeneration, it is advantageous to provide ahead of the processing stage, a preheating stage in which the catalyst may be heated for delivery to the processing stage.

In the catalytic cracking of hydrocarbon oil, in accordance with the invention, the oil is preheated to the desired temperature of reaction or to a temperature approaching such temperature and directed through the inlet 29 for passage through the catalyst. In general, the temperatures applied in catalytic cracking are upwards of 850° F. including temperatures of the order of 900° F. and 1000° F. The operation is conducted at atmospheric pressure or at moderate super-atmospheric pressures such a around 50 lbs. pressure, since the low pressures are more satisfactory in catalytic cracking than high pressures. The invention facilitates operations with high space velocities and short cycles of processing and regenerating.

Although a preferred embodiment of the invention has been described herein, it will be understood that various changes and modifications may be made therein, while securing to a greater or less extent some or all of the benefits of the invention, without departing from the spirit and scope thereof.

I claim:

1. In apparatus for the catalytic treatment of hydrocarbons, an elongated cylindrical chamber, a plurality of retaining elements adapted for the segregation of beds of pulverulent catalyst and adapted for translation within the chamber, an opening at one end of the chamber adapted for the insertion of said retaining elements individually in seriatim, a hopper adapted to charge pulverulent catalyst into the chamber, a power actuated piston so disposed at said end of the chamber that upon retraction said opening is exposed for the insertion of a retaining element and upon the forward movement of which the inserted retaining element is pushed forward beneath the hopper and inflow and outflow ports in a succeeding portion of the chamber disposed to provide transverse flow of fluids thru the several increments of catalyst as moved thru the chamber by the translation of the retaining elements.

2. In apparatus for the catalytic treatment of hydrocarbons, an elongated cylindrical chamber, a plurality of spools adapted for translation within the chamber, an opening at one end of the chamber adapted for the insertion of the spools individually in seriatim, a hopper adapted to charge pulverulent catalyst into the chamber, a power actuated piston so disposed at said end of the chamber that upon retraction said opening is exposed for the insertion of a spool and upon the forward movement the inserted spool is pushed beneath the hopper and inflow and outflow ports in a succeeding portion of the chamber disposed to provide transverse flow of fluids thru the several increments of catalyst as moved thru the chamber by the translation of the spools.

EVERETT M. BARBER.

REFERENCES CITED

The following references are of record in the file of this patent:

UNITED STATES PATENTS

| Number | Name | Date |
|---|---|---|
| 1,048,019 | Wilson | Dec. 24, 1912 |
| 2,304,397 | Campbell | Dec. 8, 1942 |
| 2,327,438 | Kuhn | Aug. 24, 1943 |